(12) United States Patent
Lacko

(10) Patent No.: US 11,441,482 B2
(45) Date of Patent: Sep. 13, 2022

(54) SINGLE TRACK TRANSLATING INLET

(71) Applicant: ROHR, INC., Chula Vista, CA (US)

(72) Inventor: Anthony Lacko, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 356 days.

(21) Appl. No.: 16/431,170

(22) Filed: Jun. 4, 2019

(65) Prior Publication Data

US 2020/0386158 A1 Dec. 10, 2020

(51) Int. Cl.
*F02C 7/042* (2006.01)
*B64D 33/02* (2006.01)

(52) U.S. Cl.
CPC .............. *F02C 7/042* (2013.01); *B64D 33/02* (2013.01)

(58) Field of Classification Search
CPC ........... F02C 7/042; F02C 7/057; B64D 33/02
See application file for complete search history.

(56) References Cited

U.S. PATENT DOCUMENTS

| | | | |
|---|---|---|---|
| 3,763,874 A | 10/1973 | Wilde et al. | |
| 3,974,648 A | 8/1976 | Kepler | |
| 5,014,933 A * | 5/1991 | Harm | B64D 33/02 181/220 |
| 7,837,142 B2 | 11/2010 | Chase et al. | |
| 8,181,905 B2 * | 5/2012 | McDonough | B64D 29/00 244/53 B |
| 9,908,633 B2 | 3/2018 | Huynh et al. | |
| 10,221,764 B2 | 3/2019 | Labrecque et al. | |
| 2010/0084507 A1 * | 4/2010 | Vauchel | B64D 33/02 244/1 N |
| 2010/0252689 A1 * | 10/2010 | Vauchel | B64D 29/08 244/53 B |
| 2011/0014044 A1 * | 1/2011 | Vauchel | B64D 29/06 415/214.1 |
| 2015/0060607 A1 | 3/2015 | Havar et al. | |
| 2015/0125270 A1 | 5/2015 | Suciu et al. | |
| 2015/0285185 A1 | 10/2015 | Caruel | |
| 2016/0053683 A1 * | 2/2016 | Labrecque | F02C 7/045 60/226.1 |
| 2017/0158341 A1 * | 6/2017 | Kawai | B64D 33/02 |

FOREIGN PATENT DOCUMENTS

| | | |
|---|---|---|
| DE | 1751112 | 12/1973 |
| EP | 0414531 | 2/1991 |
| EP | 2199204 | 6/2010 |

(Continued)

OTHER PUBLICATIONS

European Patent Office, European Search Report dated May 25, 2020 in Application No. 19216723.7.

(Continued)

*Primary Examiner* — Andrew H Nguyen
(74) *Attorney, Agent, or Firm* — Snell & Wilmer L.L.P.

(57) ABSTRACT

A translating inlet assembly may comprise a first inlet portion and a second portion configured to translate relative to the first portion. A track may be located in the first portion. A rail may be coupled to the second portion and configured to translate along the track. The rail and the track may form a load bearing component configured to transfer inertial loads experienced by the second portion. A first actuator may be operationally coupled to the rail and configured to drive the rail along the track.

12 Claims, 6 Drawing Sheets

(56) References Cited

FOREIGN PATENT DOCUMENTS

| | | |
|---|---|---|
| EP | 2222560 | 9/2010 |
| EP | 2316727 | 5/2011 |
| EP | 2631181 | 8/2013 |
| EP | 2987989 | 2/2016 |
| GB | 2274490 | 7/1994 |
| WO | 2009101273 | 8/2009 |

OTHER PUBLICATIONS

European Patent Office, European Office Action dated Oct. 20, 2021 in Application No. 19216723.7.

* cited by examiner

SINGLE TRACK TRANSLATING INLET

FIELD

The present disclosure relates to aircraft nacelles, and more particularly to a single track translating inlet.

BACKGROUND

A nacelle for a turbine engine typically includes an inlet, a fan cowl, a thrust reverser, and an exhaust section. The nacelle is typically mounted to a wing or a fuselage of an aircraft via a pylon. During various operating conditions and mission profiles, it is beneficial to modulate mass flow rate through the inlet of the nacelle. Accordingly, a shape or area defined by the inlet may be changed.

SUMMARY

A translating inlet assembly for a nacelle is disclosed herein. In accordance with various embodiments, the translating inlet assembly may comprise a first portion and a second portion configured to translate relative to the first portion. A track may be located in the first portion. A rail may be coupled to the second portion and configured to translate along the track. The rail and the track may form a load bearing component configured to transfer inertial loads experienced by the second portion. A first actuator may be operationally coupled to the rail. The first actuator may be configured to drive the rail along the track.

In various embodiments, a guide rod may extend from the second portion. The guide rod may be located through an orifice defined by the first portion. In various embodiments, the guide rod may include a stop configured to limit a translation of the guide rod.

In various embodiments, a second actuator may be operationally coupled to the guide rod. In various embodiments, an electrical conduit may be located through a channel defined by at least one of the rail or the guide rod.

In various embodiments, a fluid conduit may be located through at least one of the rail or the guide rod. In various embodiments, a support strut may be located within the first portion and configured to support the guide rod.

In various embodiments, the rail and the track may be configured to divert the inertial loads experienced by the second portion away from the first actuator.

A nacelle is also disclosed herein. In accordance with various embodiments, the nacelle may comprise a pylon and a translating inlet assembly. The translating inlet assembly may comprise a first portion, a second portion configured to translate relative to the first portion, a track located in the first portion and coupled to the pylon, a rail coupled to the second portion and configured to translate along the track, and a first actuator operationally coupled to the rail. The first actuator may be configured to drive the rail along the track. The rail and the track may form a load bearing component configured to transfer inertial loads experienced by the second portion to the pylon.

In various embodiments, the translating inlet assembly may further comprise a guide rod extending from the second portion. In various embodiments, the guide rod may be located through an orifice defined by the first portion.

In various embodiments, a second actuator may be operationally coupled to the guide rod. In various embodiments, an electrical conduit may be located through a channel defined by at least one of the rail or the guide rod.

In various embodiments, a fluid conduit may be located through at least one of the rail or the guide rod. In various embodiments, the translating inlet assembly may further comprise a support strut located within the first portion and configured to support the guide rod.

In various embodiments, the rail and the track may be configured to divert the inertial loads experienced by the second portion away from the first actuator.

A propulsion system is also disclosed herein. In accordance with various embodiments, the propulsion system may comprise a gas turbine engine, a pylon mounted to the gas turbine engine, and a translating inlet assembly located forward the gas turbine engine. The translating inlet assembly may comprise a first portion, a second portion configured to translate relative to the first portion, a track located in the first portion and coupled to the pylon, a rail coupled to the second portion and configured to translate along the track, and a first actuator operationally coupled to the rail. The first actuator may be configured to drive the rail along the track. The rail and the track may form a load bearing component configured to transfer inertial loads experienced by the second portion to the pylon.

In various embodiments, the translating inlet assembly may further comprise a guide rod extending from the second portion. The guide rod may be located through an orifice defined by the first portion.

In various embodiments, a second actuator may be operationally coupled to the guide rod. In various embodiments, the rail and the track may be configured to divert the inertial loads experienced by the second portion away from the first actuator.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
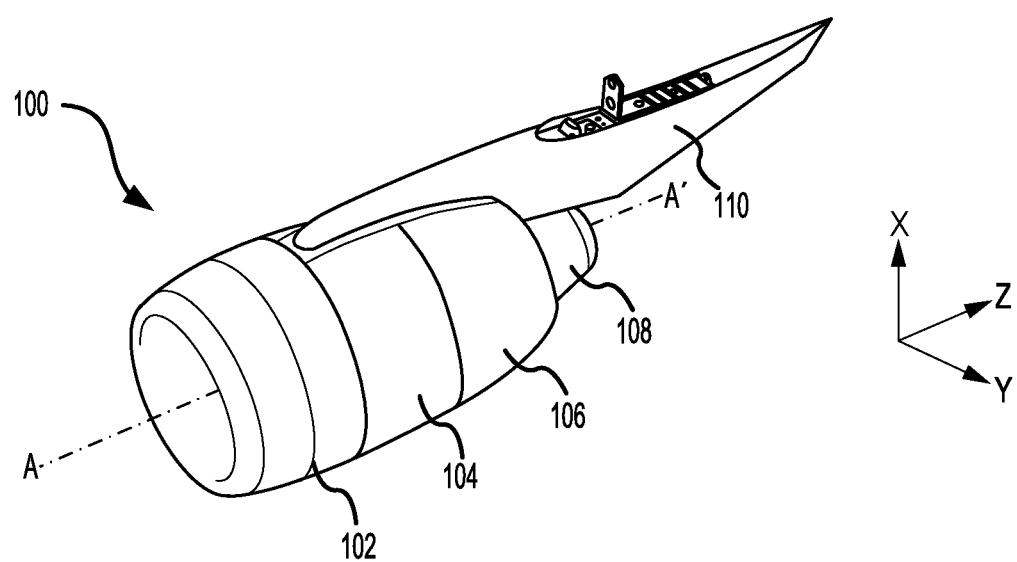
FIG. 1A illustrates a perspective view of a nacelle, in accordance with various embodiments.

Referring to FIG. 1A, a nacelle 100 for a propulsion system is illustrated, in accordance with various embodiments. Nacelle 100 may comprise a translating inlet assembly 102, a fan cowl 104, a thrust reverser 106, and an exhaust system 108. In various embodiments, nacelle 100 may include a pylon 110. Pylon 110 may be configured to mount nacelle 100 and an engine surrounded by nacelle 100 to an aircraft structure 118, with momentary reference to FIG. 3A, such as a wing or aircraft fuselage.

Figure 1B:
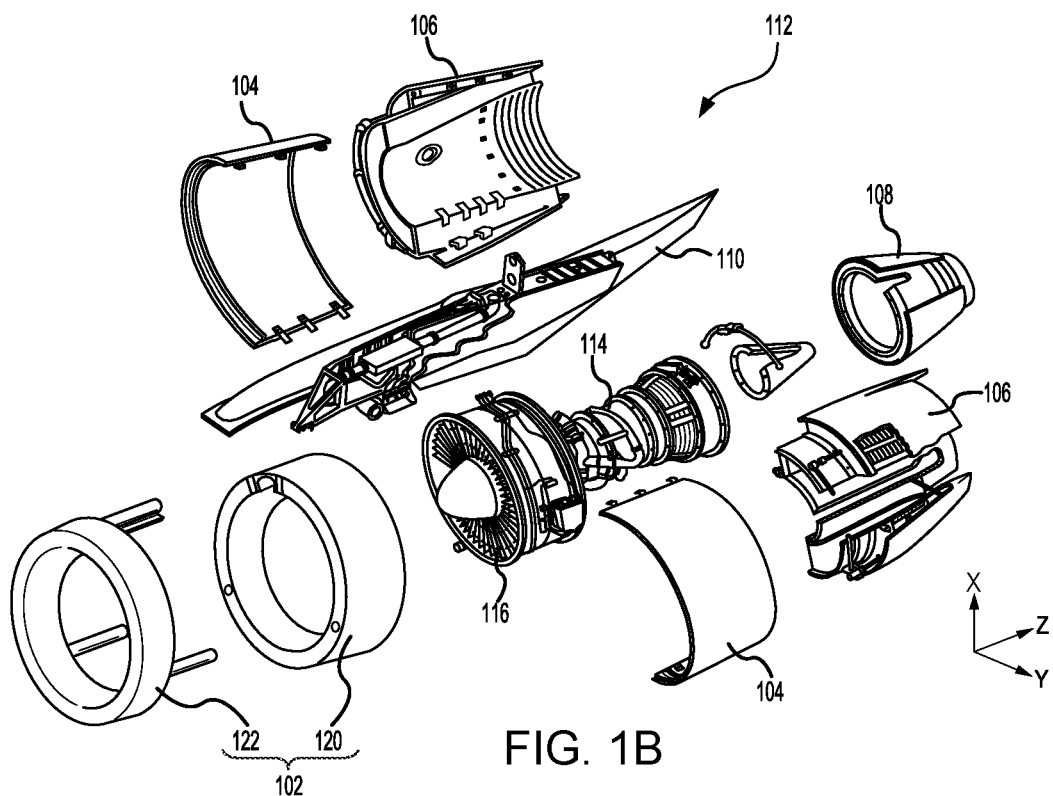
FIG. 1B illustrates an exploded view of a propulsion system, in accordance with various embodiments.

With reference to FIG. 1B, and continuing reference to FIG. 1A, an exploded view of a propulsion system 112 is illustrated, in accordance with various embodiments. In accordance with various embodiments, propulsion system 112 includes nacelle 100 and a gas turbine engine 114. Gas turbine engine 114 may be surrounded by components of nacelle 100. Nacelle 100 may provide smooth, aerodynamic surfaces for airflow around and into gas turbine engine 114.

In operation, a fan 116 of gas turbine engine 114 draws and directs a flow of air into and through propulsion system 112. Although gas turbine engine 114 is depicted as a turbofan gas turbine engine herein, it should be understood that the concepts described herein are not limited to use with turbofans as the teachings may be applied to other types of turbine engines including turbojet engines, low-bypass turbofans, high bypass turbofans, or any other gas turbine.

In accordance with various embodiments, nacelle 100 includes a translating inlet assembly 102. Translating inlet assembly 102 may include a first portion 120 and a second portion 122. Second portion 122 is located forward of first portion 120. Second portion 122 is configured to translate relative to the first portion 120. In this regard, first portion 120 may be a stationary component, which does not translate relative to other structures (e.g., fan cowl 104, pylon 110) of nacelle 100. In various embodiments, first portion 120 may be coupled forward of fan 116 of gas turbine engine 114.

In accordance with various embodiments, translating inlet assembly 102 is configured such that second portion 122 is located a first axial distance from first portion 120 during a first flight condition and a second axial distance from first portion 120 during a second flight condition. It is contemplated and understood that translating inlet assembly 102 may be configured to translate second portion 122 during any desired flight conditions. For example, in various embodiments, when propulsion system 112 is producing a first speed, second portion 122 may be located a first axial distance from first portion 120, and when propulsion system 112 is producing a second speed, different from the first speed, second portion 122 may be located a second, greater axial distance from first portion 120.

Figure 2A:
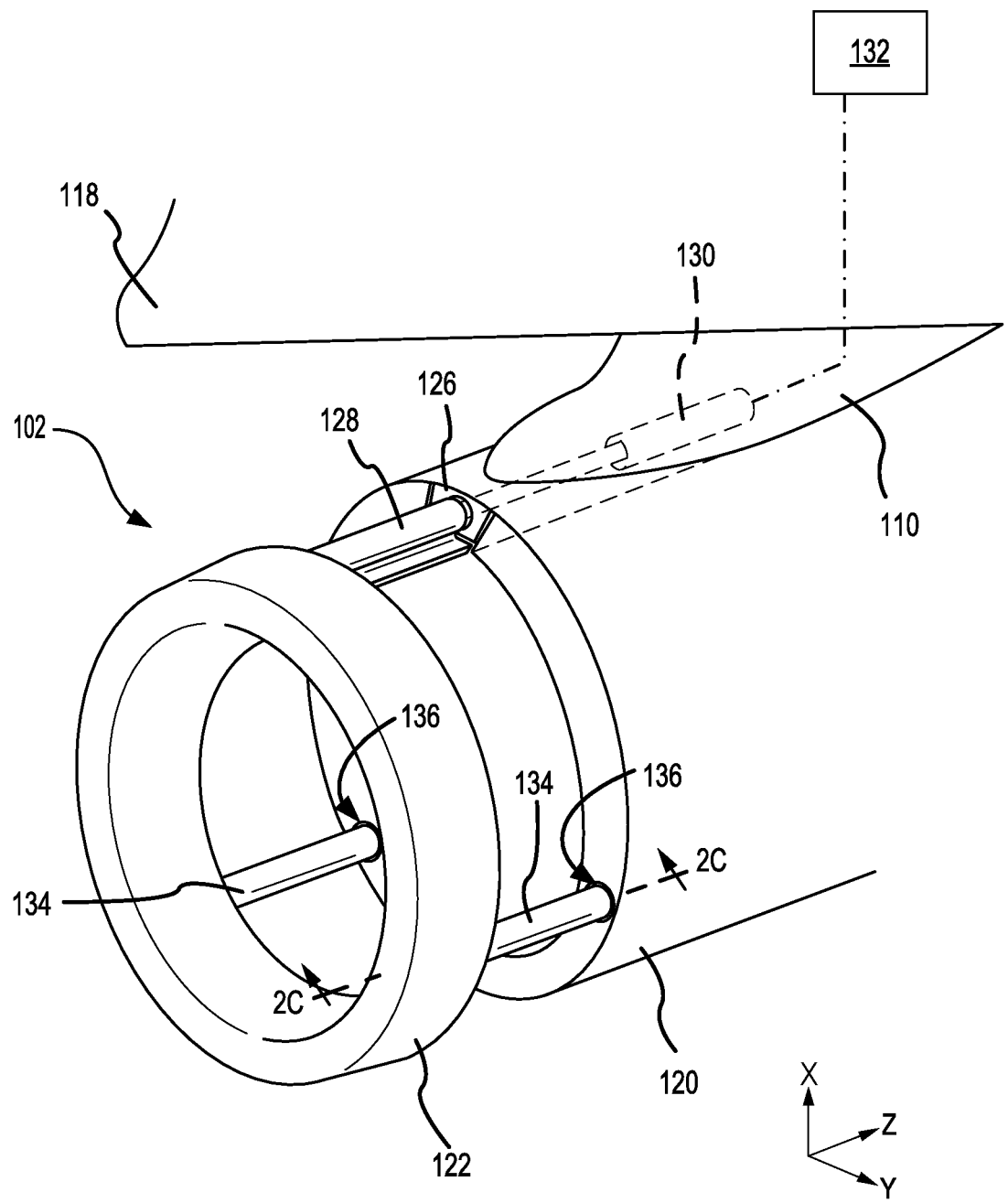
FIG. 2A illustrates a perspective view of a translating inlet assembly for a nacelle, in accordance with various embodiments.
Figure 2B:
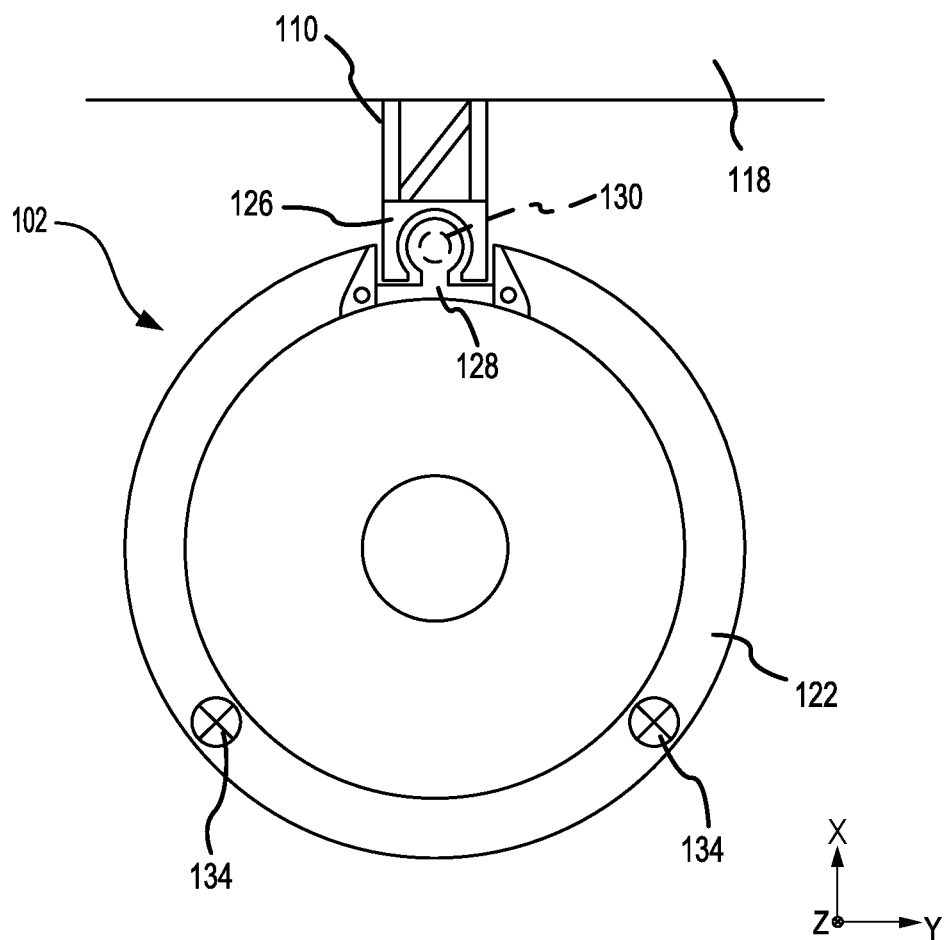
FIG. 2B illustrates an aftward-looking view of a translating inlet assembly for a nacelle, in accordance with various embodiments.

Referring to FIGS. 2A and 2B, translating inlet assembly 102 includes a track 126 and a rail 128. Track 126 may be located within first portion 120. Stated differently, first portion 120 may define a channel configured to receive to track 126. Track 126 is coupled to pylon 110. In various embodiments, track 126 may be integral to pylon 110. Track 126 is configured to transfer loads (e.g., inertial loads) experienced by second portion 122 to pylon 110.

Rail 128 is coupled to second portion 122. Rail 128 extends aftward from second portion 122. Rail 128 is configured to translate along track 126. Translation of rail 128 along track 126 drives the translation of second portion 122 relative to first portion 120. Rail 128 is coupled to second portion 122 and track 126 such that loads experienced by second portion 122 are transferred to track 126 via rail 128. In this regard, track 126 and rail 128 form a load bearing component configured to structurally support second portion 122 and transfer loads (e.g., inertial loads) experienced by second portion 122 to pylon 110.

In accordance with various embodiments, translating inlet assembly 102 further includes an actuator 130. Actuator 130 is operationally coupled to rail 128. Actuator 130 is configured to drive translation of rail 128 and second portion 122. Actuator 130 may comprise an electric, hydraulic, pneumatic, or any other type actuator capable of driving translation of rail 128 and second portion 122. In various embodiments, actuator 130 is a linear actuator. Actuator 130 is positioned such that actuator 130 does not experience the inertial loads applied to second portion 122. Stated differently, track 126 and rail 128 may divert the inertial loads away from actuator 130. In this regard, actuator 130 is not an inertial load bearing component. Actuator 130 may thus be smaller and/or lighter than actuators that support inertial loads.

In various embodiments, a controller 132 is in operable communication with actuator 130. Controller 132 may control actuation of actuator 130 and thus the translation of rail 128 and second portion 122. For example, controller 132 may send actuation commands to actuator 130. Controller 132 may be a standalone controller or controller 132 may be incorporated into an overall control for gas turbine engine 114, such as a full authority digital engine control (FADEC).

Figure 2C:
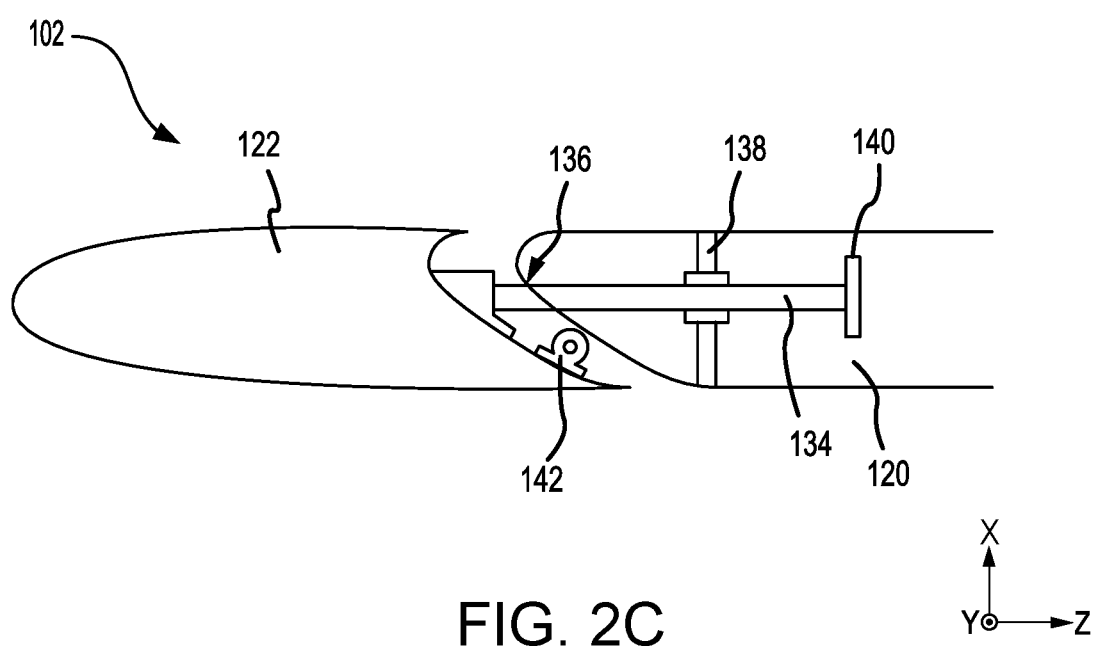
FIG. 2C illustrates a cross-section view of a guide rod of translating inlet assembly taken along the line 2C-2C in FIG. 2A, in accordance with various embodiments.

Referring to FIG. 2C, and with continued reference to FIGS. 2A and 2B, in various embodiments, translating inlet assembly 102 may further include one or more guide rods 134. Guide rods 134 may be coupled to second portion 122. Guide rods 134 extend aftward from second portion 122. In various embodiments, guide rods 134 are each located through an orifice 136 defined by first portion 120. Stated differently, first portion 120 may define orifices 136 configured to receive guide rods 134. Guide rods 134 may help to stabilize second portion 122 during translation.

One or more support struts 138 may be located within first portion 120. Support struts 138 provide structural support to guide rods 134. In various embodiments, support strut 138 may be part of an inlet bulkhead. In various embodiments, the interface between guide rods 134 and support struts 138 may be a sliding interface, wherein guide rods 134 translate over a smooth surface of support struts 138. In various embodiments, the interface between guide rods 134 and support struts 138 may be a geared interface, a roller system, or any other desired mechanical guidance system configured to support and guide translation of guide rods 134 along support struts 138.

In various embodiments, guide rods 134 may include a stop 140. Stop 140 is configured to generate an interference with support struts 138 and/or with first portion 120 to limit translation of second portion 122. For example, should second portion 122 become disconnected from track 126, the interference between stop 140 and support struts 138 and/or between stop 140 and first portion 120 may retain second portion 122 (i.e., prevent second portion 122 from completely separating from nacelle 100). In various embodiments, rail 128 may include a track stop, similar to stop 140. In various embodiments, a seal 142 may be coupled to first portion 120 or second portion 122. Seal 142 may be configured to reduce or prevent air from flowing between first portion 120 and second portion 122, when translating inlet assembly 102 is in a closed or stowed position.

Translating second portion 122 via load bearing track 126 provides a structurally efficient load path. The inertial loads experienced by second portion 122 are transferred to pylon 110 through track 126, rather than through components of an actuator, which allows for lighter, less complex actuators. In this regard, the number and size of actuators employed by translating inlet assembly 102 may be reduced, which tends to decrease weight, costs, integration risks, and opportunities for component malfunction.

Figure 3A:
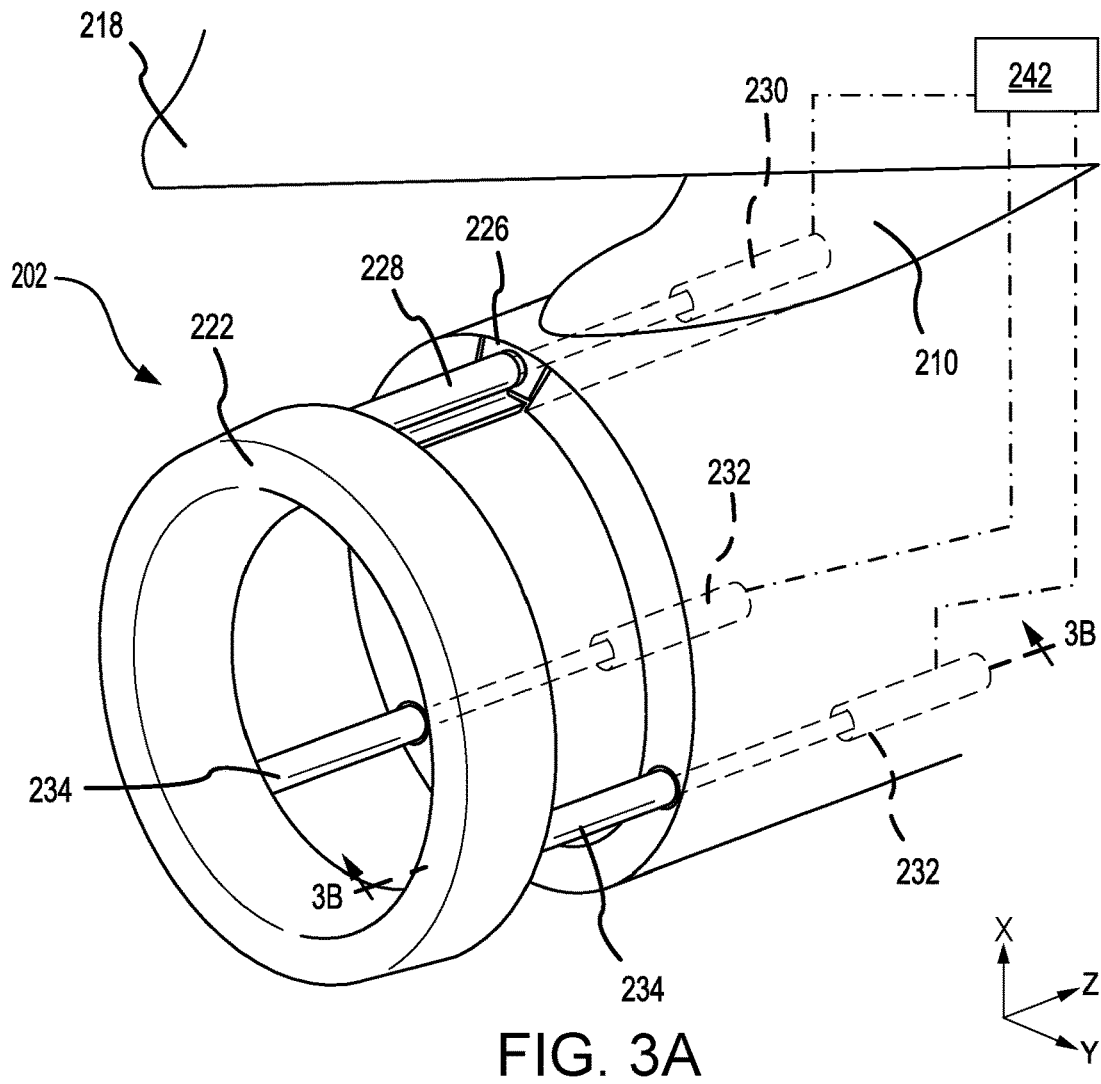
FIGS. 3A and 3B illustrate, respectively, a perspective view and a cross-section view of a translating inlet assembly having multiple actuators, with the cross-section taken along the line 3B-3B in FIG. 3A, in accordance with various embodiments.
Figure 3B:
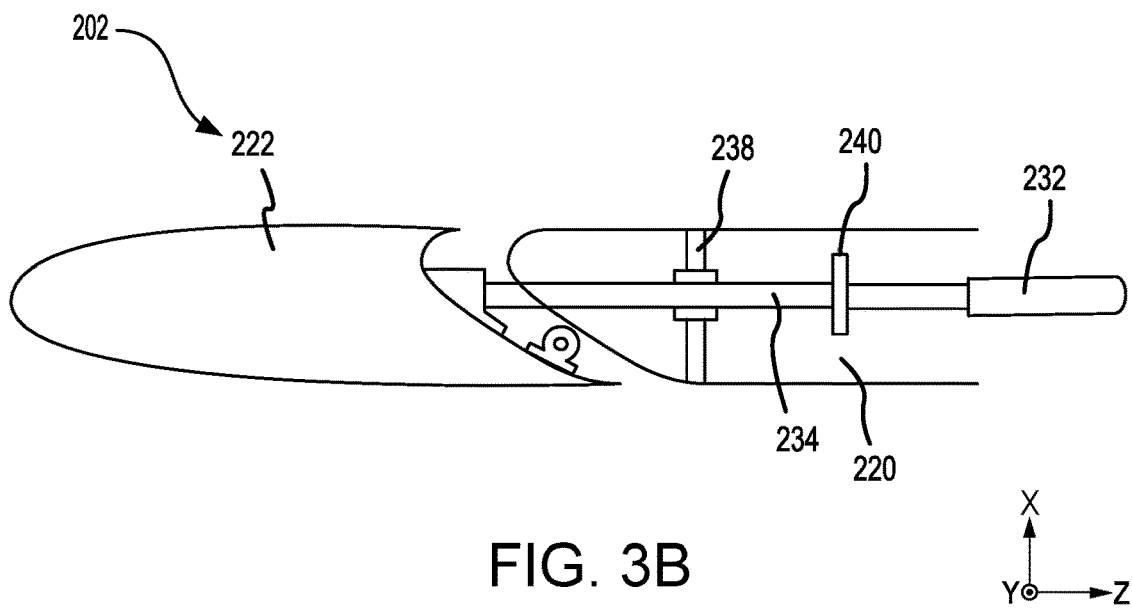

Referring to FIGS. 3A and 3B, a translating inlet assembly 202 is illustrated, in accordance with various embodiments. Translating inlet assembly 202 includes a first portion 220 and a second portion 222, similar to first and second portions 120, 122 in FIG. 3A. Second portion 222 is configured to translate relative to the first portion 220.

In accordance with various embodiments, a track 226 may be located within first portion 220. Track 226 is coupled to a pylon 210. Pylon 210 is mounted to an aircraft structure 218. Track 226 is configured to transfer loads (e.g., inertial loads) experienced by second portion 222 to pylon 210. A rail 228 is coupled to second portion 222. Rail 228 is configured to translate along track 226. Translation of rail 228 drives the translation of second portion 222 relative to first portion 220. Rail 228 is coupled to second portion 222 and track 226 such that loads experienced by second portion 222 are transferred to track 226 via rail 228. In this regard, track 226 and rail 228 form a load bearing component configured to structurally support second portion 222 and transfer loads (e.g., inertial loads) experienced by second portion 222 to pylon 210.

Translating inlet assembly 202 may further include one or more guide rods 234. Guide rods 234 may be coupled to second portion 222. Guide rods 234 extend aftward from second portion 222. One or more support struts 238 may be located within first portion 220. Support struts 238 provide structural support to guide rods 234. In various embodiments, support strut 238 may be part of an inlet bulkhead. In various embodiments, guide rods 234 may include a stop 240 configured to generate an interference with support struts 238 and/or with first portion 220 to limit translation of second portion 222.

In accordance with various embodiments, translating inlet assembly 202 further includes a first actuator 230 operationally coupled to rail 228. First actuator 230 is configured to drive translation of rail 228 and second portion 222. Translating inlet assembly 202 may further include one or more second actuators 232. Second actuators 232 are each operationally coupled to a guide rod 234. First actuator 230 is configured to drive translation of rail 228. Second actuators 232 are configured to drive translation of guide rods 234. First and second actuators 230, 232 may comprise electric, hydraulic, pneumatic, or any other type actuator capable of driving translation of rail 228 and guide rods 234. In various embodiments, first actuator 230 and/or second actuators 232 may be linear actuators.

In various embodiments, a controller 242 is in operable communication with first and second actuators 230, 232. Controller 242 may control actuation of first and second actuators 230, 232 and thus controls the translation of rail 228, guide rods 234, and second portion 222. For example, controller 242 may send actuation commands to first and second actuators 230, 232. Controller 242 may be a stand-alone controller or may be incorporated into an overall control for gas turbine engine 114, such as a FADEC.

First and second actuators 230, 232 are positioned such that they do not experience the inertial loads applied to second portion 222. Stated differently, track 226 and rail 228 may divert the inertial loads away from first and second actuators 230, 232. In this regard, first and second actuators 230, 232 are not inertial load bearing components. First and second actuators 230, 232 may thus be smaller and/or lighter, as compared to actuators that support inertial loads.

Figure 4A:
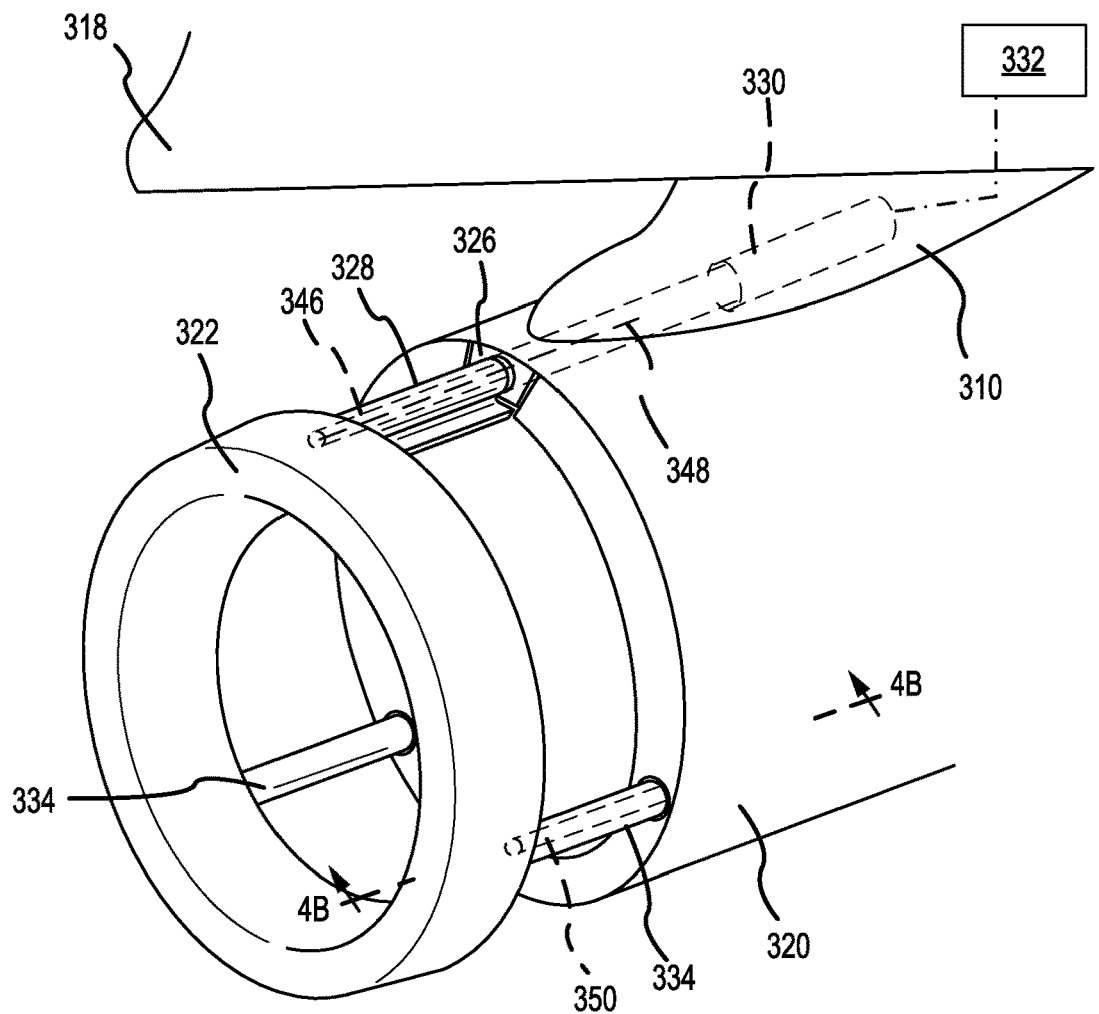
FIGS. 4A and 4B illustrate, respectively, a perspective view and a cross-section view of a translating inlet assembly including conduit channels, with the cross-section taken along the line 4B-4B in FIG. 4A, in accordance with various embodiments.
Figure 4B:
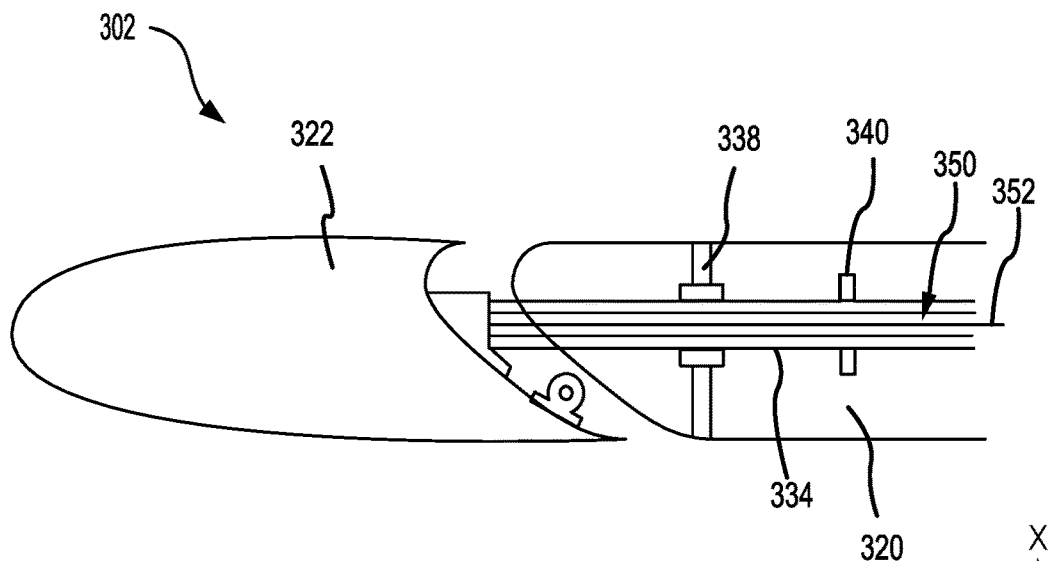

Referring to FIGS. 4A and 4B, a translating inlet assembly 302 is illustrated, in accordance with various embodiments. Translating inlet assembly 302 includes a first portion 320 and a second portion 322, similar to first and second portions 120, 122 in FIG. 3A. Second portion 322 is configured to translate relative to the first portion 320.

In accordance with various embodiments, a track 326 may be located within first portion 320. Track 326 is coupled to a pylon 310. Pylon 310 is mounted to an aircraft structure 318. Track 326 is configured to transfer loads (e.g., inertial loads) experienced by second portion 322 to pylon 310. A rail 328 is coupled to second portion 322. Rail 328 is configured to translate along track 326. Translation of rail 328 drives the translation of second portion 322 relative to first portion 320. Rail 328 is coupled to second portion 322 and track 326 such that loads experienced by second portion 322 are transferred to track 326 via rail 328. In this regard, track 326 and rail 328 form a load bearing component configured to structurally support second portion 322 and transfer loads (e.g., inertial loads) experienced by second portion 322 to pylon 310.

Translating inlet assembly 302 may further include one or more guide rods 334. Guide rods 334 may be coupled to second portion 322. One or more support struts 338 may be located within first portion 320 to provide structural support for guide rods 334. In various embodiments, support strut 338 may be part of an inlet bulkhead. In various embodiments, guide rods 334 may include a stop 340 configured to generate an interference with support struts 338 and/or with first portion 320 and limit translation of second portion 322.

In accordance with various embodiments, translating inlet assembly 302 further includes an actuator 330 operationally coupled to rail 328. Actuator 330 may be similar to actuator 130, in FIG. 2A. A controller 332, similar to controller 132 in FIG. 2A, is in operable communication with actuator 130.

In various embodiments, rail 328 may define one or more rail channels 346. Stated differently, rail channel(s) 346 may be formed through rail 328. In various embodiments, a conduit 348 may be located within rail channel 346. In various embodiments, conduit 348 may comprise a fluid conduit, through which gas or liquid may flow. For example, conduit 348 may be fluidly coupled to a hot air source of an anti-ice or de-icing system. In this regard, hot air may flow into second portion 322 via conduit 348 and/or via rail channel 346. In various embodiments, conduit 348 may comprise an electrical conduit configured to provide electrical power (e.g., current) to one or more electrical components of second portion 322. For example, conduit 348 may be electrically coupled between a power source and a heating element located in second portion 322. In various embodiments, conduit 348 may be electrically coupled between a power source and one or more sensors located in second portion 322.

In various embodiments, guide rod 334 may define one or more rod channels 350. Stated differently, rod channel(s) 350 may be formed through guide rod 334. In various embodiments, a conduit 352 may be located within rod channel 350. In various embodiments, conduit 352 may comprise a fluid conduit, through which gas or liquid may flow. For example, conduit 352 may be fluidly coupled to a hot air source of an anti-ice or de-icing system. In this regard, hot air may flow into second portion 322 via conduit 352 and/or via rod channel 350. In various embodiments, conduit 352 may comprise an electrical conduit configured to provide electrical power (e.g., current) to one or more electrical components of second portion 322. For example, conduit 352 may be electrically coupled between a power source and a heating element located in second portion 322. In various embodiments, conduit 352 may be electrically coupled between a power source and one or more sensors located in second portion 322.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A translating inlet assembly for a nacelle, the translating inlet assembly comprising:
    a first portion;
    a second portion configured to translate relative to the first portion;
    a track located in the first portion;
    a rail coupled to the second portion and configured to translate along the track, wherein the rail and the track form a load bearing component configured to transfer inertial loads experienced by the second portion;
    a first actuator coupled to the rail and configured to drive the rail along the track;
    a guide rod extending from the second portion, wherein the guide rod is located through an orifice defined by the first portion; and
    an electrical conduit located through a channel defined by at least one of the rail or the guide rod.

2. The translating inlet assembly of claim 1, wherein the guide rod includes a stop configured to limit a translation of the guide rod.

3. The translating inlet assembly of claim 1, further comprising a second actuator operationally coupled to the guide rod.

4. The translating inlet assembly of claim 1, further comprising a support strut located within the first portion and configured to support the guide rod.

5. The translating inlet assembly of claim 1, wherein the rail and the track are configured to divert the inertial loads experienced by the second portion away from the first actuator.

6. A nacelle, comprising:
a pylon; and
a translating inlet assembly comprising:
a first portion;
a second portion configured to translate relative to the first portion;
a track located in the first portion and coupled to the pylon;
a rail coupled to the second portion and configured to translate along the track, wherein the rail and the track form a load bearing component configured to transfer inertial loads experienced by the second portion to the pylon;
a first actuator coupled to the rail and configured to drive the rail along the track;
a guide rod extending from the second portion, wherein the guide rod is located through an orifice defined by the first portion; and
an electrical conduit located through a channel defined by at least one of the rail or the guide rod.

7. The nacelle of claim 6, further comprising a second actuator operationally coupled to the guide rod.

8. The nacelle of claim 6, wherein the translating inlet assembly further comprises a support strut located within the first portion and configured to support the guide rod.

9. The nacelle of claim 6, wherein the rail and the track are configured to divert the inertial loads experienced by the second portion away from the first actuator.

10. A propulsion system, comprising:
a gas turbine engine;
a pylon mounted to the gas turbine engine; and
a translating inlet assembly located forward of the gas turbine engine, the translating inlet assembly comprising:
a first portion;
a second portion configured to translate relative to the first portion;
a track located in the first portion and coupled to the pylon;
a rail coupled to the second portion and configured to translate along the track, wherein the rail and the track form a load bearing component configured to transfer inertial loads experienced by the second portion to the pylon;
a guide rod extending from the second portion, wherein the guide rod is located through an orifice defined by the first portion;
an electrical conduit located through a channel defined by at least one of the rail or the guide rod;
a first actuator operationally coupled to the rail, wherein the first actuator is configured to drive the rail along the track; and
a controller in operable communication with the first actuator and configured to send actuation commands to the first actuator, wherein the controller is configured to locate the second portion a first axial distance from the first portion during a first flight condition and is further configured to locate the second portion a second axial distance from the first portion during a second flight condition, the second axial distance being greater than the first axial distance, and wherein at the second axial distance an airflow gap is formed between the first portion and the second portion such that air may flow through the airflow gap and into the gas turbine engine.

11. The propulsion system of claim 10, further comprising a second actuator operationally coupled to the guide rod.

12. The propulsion system of claim 10, wherein the rail and the track are configured to divert the inertial loads experienced by the second portion away from the first actuator.

* * * * *